US005384180A

United States Patent [19]

Oki et al.

[11] Patent Number: 5,384,180

[45] Date of Patent: Jan. 24, 1995

[54] ELECTROSTATIC RECORDING MEDIUM

[75] Inventors: Tomio Oki; Kiyoshi Iwamoto, both of Shizuoka, Japan

[73] Assignee: Tomoegawa Paper Co., Ltd., Tokyo, Japan

[21] Appl. No.: 112,350

[22] Filed: Aug. 27, 1993

[30] Foreign Application Priority Data

Aug. 28, 1992 [JP] Japan .................................. 4-251928
Sep. 18, 1992 [JP] Japan .................................. 4-273407

[51] Int. Cl.[6] .................................................. B32B 3/00

[52] U.S. Cl. .................................... 428/195; 428/204; 428/206; 428/446; 428/688; 428/704

[58] Field of Search .................. 428/488.1, 522, 537.5, 428/450, 447, 34.5, 206, 195, 204, 446, 688, 704; 346/135.1, 153.1

[56] References Cited

U.S. PATENT DOCUMENTS 4,374,895 2/1983 Yasuda et al. ....................... 428/328
4,444,847 4/1984 Fujioka et al. ....................... 428/522
5,130,177 7/1992 Lu et al. .............................. 428/195

FOREIGN PATENT DOCUMENTS 61-264345 11/1986 Japan .

*Primary Examiner*—Patrick J. Ryan
*Assistant Examiner*—William A. Krynsky
*Attorney, Agent, or Firm*—Finnegan, Henderson, Farabow, Garrett & Dunner

[57] ABSTRACT

The present invention relates to a recording medium which has an electroconductive layer which exhibits strong stable resistance to humidity and water, and provides high precision visual images and color reproduction of superior quality. The electroconductive substrate comprises an electroconductive layer on at least one side, wherein the electroconductive layer contains an electroconductive pigment, a normal salt and a binder; the binder contains 20 to 85 weight % of starch and the normal salt is maintained at 10 to 100 parts by weight with respect to 100 parts by weight of said electroconductive pigment. The recording medium comprises a recording layer which is formed on the electroconductive layer described above, and may contain silicone resin particles therein for further improvement of high prevision visual images.

11 Claims, No Drawings

ELECTROSTATIC RECORDING MEDIUM

BACKGROUND OF THE INVENTION

1. Field of the Invention

The present invention relates to a recording medium, and more precisely relates to a recording medium which has an electroconductive substrate and recording layer resistant to high humidity and wetting, and provides high precision visual images and color reproduction of superior quality.

2. Background Art

Electrostatic recording media are now widely used for monochrome and color printing in various automated office apparatuses such as computer printers, facsimile machines, drafting apparatuses, newspaper editors, and other kinds of recording apparatuses. In order for these apparatuses to function reliably, a recording medium which has a strong resistance to humidity and wetting has been in high demand. This demand becomes even greater when the recording medium is used outdoors.

In addition, the electrostatic recording medium is widely used in CAD-CAM systems which have become increasingly popular. Also, since the electrostatic recording medium is compatible with a color image display, the electrostatic medium can be widely used in various design and advertisement businesses. As a consequence of the increasing field of application, there has been an increasing demand for higher precision electrostatic recording medium.

A conventional electrostatic recording medium comprises an electroconductive substrate and a recording layer formed on the substrate. The electroconductive substrate includes a base sheet and an electroconductive layer laid on the base sheet, or a base sheet and an electroconductive material dispersed in the base sheet. In a typical example of a conventional electrostatic recording medium, as described in Japanese Patent Application First Publication No. 61-264345, a base sheet which is made from water resistant paper, resin film, or cloth and an electroconductive layer containing an electrolyte such as a cation polyelectrolyte comprising amino group. The electrical resistance of such conventional electroconductive substrates is not very sensitive to humidity. However, when the recording medium is wetted during use outdoors, the water soluble electrolyte tends to be washed out and consequently the recording layer tends to exfoliate. Furthermore, the conventional recording layer is sensitive to humidity, and the visual image produced thereby tends to be degraded when the medium is used in a humid environment. Therefore, the requirement for reliable service in an environment containing high humidity and wetting has not been satisfied by conventional electrostatic recording media. Furthermore, the images produced by conventional electrostatic recording media tend to become uneven, and also sometimes undesired white blots are produced due to the unevenness of the pigment particle size. Therefore, the conventional electrostatic recording media do not satisfy the demands for fine precision and color reproduction.

SUMMARY OF THE INVENTION

The purpose of the present invention to provide an electrostatic recording medium which is resistant to high humidity and wetting, and satisfies the demand for fine precision and color reproduction under various conditions of employment.

The recording medium proposed by the present invention comprises an electroconductive substrate which has a base sheet and an electroconductive layer formed on at least one side of the base sheet, wherein the electroconductive layer contains an electroconductive pigment, a normal salt and a binder. The binder contains 20 to 85% by weight of starch. The amounts of the normal salt versus that of the electroconductive pigments is, respectively, 100 parts by weight versus 10 to 100 parts by weight. In addition, a recording layer, which is formed on the electroconductive substrate, may contain silicone resin particles therein for further improvement of the resistance to high humidity and wetting.

DETAILED DESCRIPTION OF THE INVENTION

An electroconductive recording medium according to the present invention contains an electroconductive substrate, which consists of a base sheet and an electroconductive layer formed on the base sheet, and a recording layer. The electroconductive layer contains an electroconductive pigment, a normal salt and a binder. The binder contains 20 to 85% by weight of starch and a water soluble resin such as a water soluble high polymer or a water dispersible high polymer. The starch is one or more of α-starch, β-starch, oxidized starch, etherified starch, acetyl starch, methy starch, carboxylic modified starch, allyl starch or other derivatives. When the starch is less than 20 weight %, the recording quality is unfavorably influenced by humidity. When the starch exceeds 85% by weight, the water resistance of the recording medium is degraded.

The water soluble high polymer or water dispersible high polymer which is used as a binder is polyvinyl alcohol, modified polyvinyl alcohol, hydroxy ethyl cellulose, methyl cellulose, carboxylmethyl cellulose, casein, gelatin, sodium arginate, polyvinyl pyrrolidone, polyacrylamide, modified polyacrylamide, alkaline aqueous solution of isobutylene maleic anhydride copolymeric resin, alkaline aqueous solution of diisobutylene maleic anhydride copolymeric resin, water-dispersed polyester, water-dispersed polyurethane, copolymer of (meth)acrylate copolymer, styrene-(meth)acrylic copolymer, styrene-butadiene copolymer, polyvinyl chloride, polyvinyl acetate, vinyl chloride-vinyl acetate copolymer, or polyvinylidene chloride, and the derivatives thereof. One or more of the above-stated materials can be used as a binder. A water dispersible high polymer is more preferable to a water soluble high polymer due to its higher water resistance. In order to improve the water resistance, an additive such as glyoxal, chromium alum, melamine resin, melamine formaldehyde resin, polyamide resin, or polyamide-epichlorohydrine resin can be added.

The normal salt to be used in this invention is, for example, sodium chloride, potassium chloride, potassium bromide, sodium acetate, or copper sulfate. However, the normal salt is not limited to the above-listed salts. The sodium chloride is used most preferably due to its low price and facility in handling. The amount of the normal salt should be between 10 to 100 parts by weight in the electroconductive layer when the electroconductive pigment is 100 parts by weight. When the amount of the normal salt is less than or more than the above-stated range, the visual image produced by the recording medium is degraded at high humidity.

Conventional electroconductive material or inorganic compounds doped with an electroconductive material may be used as the electroconductive pigment to be used in the present invention. For example, the electroconductive material can be one of carbon black, graphite, tin oxide, antimony oxide, gold, silver, copper, or nickle; and the inorganic compound can be zinc oxide, titanium dioxide, aluminum oxide, sodium carbonate, barium sulfate, mica, potassium titanate, aluminum borate, silicon carbide, or the like. Due to its economy in volume, the inorganic compound having a needle shaped crystal is preferably used for the above-stated purpose to obtain the same effects. Preferable examples are crystaline wiskers of potassium titanate, silicon carbide, and aluminum borate doped with tin oxide, antimony oxide, gold, or silver. The crystaline wiskers having a longitudinal diameter of 5 to 100 microns and a transversal diameter of 0.1 to 1 micron is preferable.

The amount of the electroconductive pigment is, in general, preferably maintained at 70 to 900 parts by weight with respect to 100 parts by weight of the binder. However, when crystaline structures having a needle shape are used, the amount is preferably between 20 to 150 parts by weight instead of 70 to 900 parts by weight.

The electroconductive layer contains an electroconductive pigment, a normal salt, and a binder containing a starch at a specific rate as described above. The recording quality, which has the degree of resistance to humidity and wetting required for outdoor use, is obtained only by the above construction of the recording medium. An inorganic pigment such as silica, aluminum hydroxide, caorine, talc, mica, calcium carbonate, or an organic pigment such as cellulose powder, polyethylene powder, polypropylene powder, polystyrene powder can be added as far as the addition of this pigment does not hinder the characteristics of the electroconductive layer.

The electrostatic recording medium according to the present invention is further provided with a recording layer on the electroconductive layer described above. When an electroconductive layer is provided on each side of the substrate, the recording layer is formed on one of the electroconductive layers. In regard to the recording layer containing silicone particles, various resin materials can be used as long as the material has a high electrical resistance and the material is soluble in organic solvents. For example, the material can be polyester, polycarbonate, polyamide, polyurethane, methacrylate resin, styrene resin, olefin resin, silicone resin, fluorine-containing resin, and the like. In addition to such materials, organic or inorganic pigments can be added so as to improve writing with ink and the like. However, the amount of additional pigment should not exceed a certain amount so as not to degrade the above-stated improvement of quality produced by the silicone particles. It is preferable that silicone resin particles are contained in the recording layer. Any resin particles containing an effective amount of organopolysiloxane having a three dimensional net structure can be used as the silicone resin particle stated above. Preferably, the silicone resin particle should have a structure wherein a silicone atom is combined with a methyl group because of its superior stability against solvents and heat. For example, the silicone resin particles of Tospearl 103, 105, 108, 120, 130, 145, 3120, 240 of Toshiba Silicone (trade names) are suitable for that purpose.

The size of the silicone resin particles is not restricted in the present invention. However, a particle size of 0.3 to 12 microns is desirable, and a range of 0.5 to 5.0 microns is further preferable in the present invention. The distribution of the size of the particle is not important as long as the particle size is smaller than 12 microns. However, the particle size should not exceed 12 microns preferably so as not to degrade the uniformity of the visual image. It is preferable that the proportion of silicone resin particles is 0.4 to 45 weight % in the recording layer. When the silicone resin particles exceed 45 weight % of the recording layer, the density or the recorded image becomes insufficient. When the silicone resin particles is less than 0.4 weight %, the recorded image tends to be uneven or white spots appear in the image.

The electroconductive layer and the recording layer of the present invention can be formed by dissolving or dispersing the above-stated material in a solvent such as water, methanol, ethanol, toluene, acetone, methyl ethyl ketone, or ethyl acetate; applying the solution by an air knife coater, roll coater, wire bar coater, spray coater, fountain coater, or reverse roll coater; and drying the solution.

The surface electrical resistance of the electroconductive layer should preferably be between $1.0\times10^5$ and $1.0\times10^9$ Ohms.

As the base sheet, non-synthetic or synthetic paper, unwoven cloth, various kinds of resin films, cloth, or leather can be used, but are not limited thereto.

A barrier layer can be formed:

(1) between the substrate and the electroconductive layer, and a surface of the substrate on which the electroconductive layer is not formed, in the case where an electroconductive layer is formed on one side of the substrate; and (2) between the substrate and at least one of the electroconductive layer in the case where the electroconductive layers are formed on both sides of the substrate. The barrier layer can be formed from various resin materials, preferably but not exclusively by an emulsion resin such as a styrene-butadiene copolymer, acrylate-acrylic copolymer, styrene-acrylic copolymer, vinyl acetate-acrylic copolymer, vinyl chloride resin, or vinyl chloride-vinyl acetate copolymer. The inorganic or organic electroconductive pigment used in the electroconductive layer may be added to the barrier layer when necessary.

The above-stated electroconductive substrate can also be used in a recording medium for electrophotography and photographic negatives or positives of electroplanography.

The present invention will be understood in detail by the description of the preferred embodiments in the following section. In the following section, the amount of the materials is given in parts by weight, unless otherwise denoted.

Preferred Embodiment 1

An electroconductive substrate according to the present invention was made using wood free paper 50 g/m$^2$, and forming an 8 g/m$^2$ electroconductive layer on one surface of the paper, applying a paint prepared by combining the ingredients described below and drying the paint.

| | |
|---|---|
| electroconductive crystal wiskers of potassium titanate: (Dentall WK-300, supplied by Otsuka Chemical) | 25 |
| water dispersible acrylic resin: (Bonron-428, containing 44.7% of solid material, supplied by Mitsui Toatsu Chemicals) | 33 |
| starch: (Unique Gum, supplied by Matsutani Kagaku Kogyo) | 83 |
| sodium chloride: (common salt, supplied by Japan Tabac) | 10 |
| water: | 500 |

Preferred Embodiment 2

An electroconductive substrate was made according to a method identical to the above-described method of Preferred Embodiment 1 except that the paint for forming the electroconductive layer was made by combining the ingredients described below:

| | |
|---|---|
| electroconducitve crystal wiskers of potassium titanate: (Dentall WK-300, supplied by Otsuka Chemical) | 25 |
| water dispersible acrylic resin: (Bonron-428, containing 44.7% of solid material, supplied by Mitsui Toatsu Chemicals) | 170 |
| starch: (Unique Gum, supplied by Matsutani Kagaku Kogyo) | 20 |
| sodium chloride: (common salt, supplied by Japan Tabac) | 10 |
| water | 420 |

Preferred Embodiment 3

An electroconductive substrate was made according to a method identical to the above-described method of Preferred Embodiment 1 except that the paint for forming the electroconductive layer was made by combining the ingredients described below:

| | |
|---|---|
| electroconductive crystal wiskers of potassium titanate: (Dentall WK-300, supplied by Otsuka Chemical) | 140 |
| water dispersible acrylic resin: (Bonron-428, containing 44.7% of solid material, supplied by Mitsui Toatsu Chemicals) | 45 |
| starch: (Unique Gum, supplied by Matsutani Kagaku Kogyo) | 80 |
| sodium chloride: (common salt, supplied by Japan Tabac) | 15 |
| water: | 1000 |

Preferred Embodiment 4

An electroconductive substrate was prepared according to the above-described method of Preferred Embodiment 3 except that the sodium chloride is 140 parts by weight.

An electrostatic recording medium was made by applying 5 g/m$^2$ of a recording layer as described below on the electroconductive layer formed according to the Preferred Embodiments 1 through 4 and Comparative Examples 1 through 4.

| | |
|---|---|
| n-butyl methacrylate-methyl methacrylate (1:1) copolymer: (molecular weight approximately 100,000, 40% toluene solution) | 100 |
| calcium carbonate: | 40 |
| toluene: | 180 |

Preferred Embodiment 5

A solution was then applied on the electroconductive layer formed according to the preferred embodiment 1 and dried so as to make a recording layer of 4 g/m$^2$. This solution was made by combining the ingredients described below:

| | |
|---|---|
| polyester resin: ("Vilon 200" of Toyobo, containing 40% solid material) | 480 |
| silicone resin powder: ("Tospearl 130" of Toshiba Silicone, particle size 3 microns) | 6 |
| toluene: | 170 |

Preferred Embodiment 6

The only difference from the above Preferred Embodiment 5 is in the solution used for forming the recording layer; this solution was made by combining the ingredients described below:

| | |
|---|---|
| polyester resin: ("Vilon 200" of Toyobo, containing 40% solid material) | 350 |
| silicone resin powder: ("Tosparl 240" of Toshiba Silicone, particle size 3 microns) | 60 |
| toluene: | 240 |

Comparative Example 1

An electroconductive substrate was made according to a method identical to the above-described method of Preferred Embodiment 1 except that the print for forming the electroconductive layer was made by combining the ingredients described below:

| | |
|---|---|
| electroconductive crystal wiskers of potassium titanate: (Dentall WK-300, supplied by Otsuka Chemical) | 25 |
| starch: (Unique Gum, supplied by Matsutani Kagaku Kogyo) | 100 |
| sodium chloride: (common salt, supplied by Japan Tabac) | 10 |
| water | 540 |

Comparative Example 2

An electroconductive substrate was made according to a method identical to the above-described method of Preferred Embodiment 1 except that the paint for forming the electroconductive layer was made by combining the ingredients described below:

| | |
|---|---|
| electroconducitve crystal wiskers of potassium titanate: (Dentall WK-300, supplied by Otsuka Chemical) | 25 |
| water dispersible acrylic resin: (Bonron-428, containing 44.7% of solid material, supplied by Mitsui Toatsu Chemicals) | 200 |
| starch: (Unique Gum, supplied by Matsutani Kagaku Kogyo) | 10 |
| sodium chloride: (common salt, supplied by Japan Tabac) | 10 |

-continued

| | |
|---|---|
| water | 400 |

Comparative Example 3

An electroconductive substrate was made according to the method described in Preferred Embodiment 3 except that 10 parts by weight of sodium chloride was used.

Comparative Example 4

An electroconductive substrate was made according to the method described in Comparative Example 3 except that 180 parts by weight of Sodium chloride was used instead of 10 parts of sodium chloride.

The procedures and results of the measurement of electrical surface resistance, inspection of the visual image and test of water resistance performed on the recording mediums made by the methods described above in the Preferred Embodiments 1 through 6 and the Comparative Examples 1 through 4 are described hereinbelow:

(1) Measurement of Electrical Surface Resistance

Electroconductive substrates were made according to the above-stated Preferred Embodiments 1 through 4 and Comparative Examples 1 through 4, and the natural electrical resistance of each substrate was measured (by using a ring-type resistance measuring instrument, at less than 100 V) after being maintained for 24 hours under three different atmospheric conditions; that is, low humidity (30° C., 20% RH), medium humidity (25° C., 65% RH), and high humidity (30° C., 80% RH).

The results are shown in Table 1. Preferred Embodiments 1 through 4 show stable surface resistance not influenced by the humidity while the surface resistance of comparative examples 3 and 4 are strongly influenced by humidity and degraded at high humidity.

(2) Inspection of Visual Image

The image data was printed on the above recording mediums by using an electrostatic color plotter (CE 3436, supplied by Versatec) at 3 different atmospheric conditions, [i.e. low humidity (30° C., 30% RH), medium humidity (20° C., 60% RH), and high humidity (30° C., 80% RH)], and the density and quality of the images (i.e. roughness, clarity, white spot, etc.) were evaluated. The density of the black parts was measured by using an RD-914 Macbeth-type reflection density meter for evaluating the density of the image.

In Table 2, a double circle (O) denotes excellent quality which is defined by the absence of roughness or white spots observed in the visual image; a circle (O) denotes good quality which is defined by the presence of one rough or white spot observed in the visual image; a cross (X) denotes the presence of more than one rough or white spot observed in the visual image.

(3) Test of Water Resistance

The recording media was submerged in water for 72 hours and the quality of the recording medium was inspected. In Table 2, with respect to water resistance, a circle (O) denotes no swollen or exfoliated part was observed, and a cross (X) denotes at least one swollen or exfoliated part was observed.

The test results shown in Table 2 indicate that the recording media of the present invention exhibits a strong stable resistance to humidity and water, and consequently guarantees good reliable performance when used outdoors. Therefore, the recording medium according to the present invention has wide application for both indoor and outdoor use.

In addition, in Table 2, the recording media of Preferred Embodiments 5 and 6, according to the present invention, demonstrate better recording quality than the medium tested in Comparative Examples 1 through 4. Therefore, visual images with

TABLE 1

| | Measurement of the electrical sheet resistivity (Ω/□) | | |
|---|---|---|---|
| | low humidity | medium humidity | high humidity |
| Preferred embodiment 1 | $1.5 \times 10^7$ | $3.0 \times 10^7$ | $5.0 \times 10^7$ |
| Preferred embodiment 2 | $2.0 \times 10^7$ | $3.2 \times 10^7$ | $5.2 \times 10^7$ |
| Preferred embodiment 3 | $7.7 \times 10^6$ | $9.3 \times 10^6$ | $1.5 \times 10^7$ |
| Preferred embodiment 4 | $2.3 \times 10^7$ | $3.0 \times 10^7$ | $7.8 \times 10^6$ |
| Comparative example 1 | $1.0 \times 10^7$ | $3.2 \times 10^7$ | $4.1 \times 10^7$ |
| Comparative example 2 | $5.0 \times 10^9$ | $5.5 \times 10^9$ | $5.3 \times 10^9$ |
| Comparative example 3 | $1.7 \times 10^7$ | $3.5 \times 10^7$ | $1.8 \times 10^9$ |
| Comparative example 4 | $2.2 \times 10^9$ | $7.2 \times 10^6$ | $8.6 \times 10^4$ |

TABLE 2

| | Evaluation of electrostatic recording quality | | | | | | |
|---|---|---|---|---|---|---|---|
| | Evaluation visual image | | | | | | |
| | low humidity | | medium humidity | | high humidity | | Water |
| | Density | Quality | Density | Quality | Density | Quality | resistance |
| Preferred embodiment | | | | | | | |
| 1 | 1.24 | ○ | 1.18 | ○ | 1.13 | ○ | ○ |
| 2 | 1.23 | ○ | 1.18 | ○ | 1.13 | ○ | ○ |
| 3 | 1.26 | ○ | 1.20 | ○ | 1.16 | ○ | ○ |
| 4 | 1.20 | ○ | 1.18 | ○ | 1.13 | ○ | ○ |
| 5 | 1.28 | ◎ | 1.21 | ◎ | 1.18 | ◎ | ○ |
| 6 | 1.24 | ◎ | 1.19 | ◎ | 1.14 | ○ | ○ |
| Comparative example | | | | | | | |
| 1 | 1.23 | ○ | 1.18 | ○ | 1.15 | ○ | X |
| 2 | 0.55 | X | 0.68 | X | 0.59 | X | ○ |

TABLE 2-continued

| | Evaluation of electrostatic recording quality | | | | | | |
| --- | --- | --- | --- | --- | --- | --- | --- |
| | Evaluation visual image | | | | | | |
| | low humidity | | medium humidity | | high humidity | | Water |
| | Density | Quality | Density | Quality | Density | Quality | resistance |
| 3 | 1.22 | ○ | 1.20 | ○ | 0.80 | X | ○ |
| 4 | 0.78 | X | 1.18 | ○ | 0.31 | X | ○ |

improved quality are obtained by the present invention under a wide range of atmospheric conditions, especially under those conditions where there is high humidity.

What is claimed is:

1. An electroconductive substrate comprising an electroconductive layer on at least one side of a base sheet, wherein said electroconductive layer contains an electroconductive pigment, a normal salt, and a water soluble or water dispersible binder; the binder contains 20 to 85 weight % of starch and the normal salt is maintained at 10 to 100 parts by weight with respect to 100 parts by weight of said electroconductive pigment.

2. An electroconductive substrate as described in claim 1, wherein the electroconductive pigment is an inorganic compound doped with an electroconductive material.

3. An electroconductive pigment as described in claim 2, wherein the inorganic compound is potassium titanate, silicon carbide or aluminum borate.

4. An electroconductive pigment as described in claim 2, wherein the inorganic compound is doped with tin oxide, antimony oxide, gold or silver.

5. An electroconductive pigment as described in claim 2, wherein the inorganic compound has crystalline whiskers having a longitudinal diameter of 5 to 100 microns and a transversal diameter of 0.1 to 1 micron.

6. An electroconductive substrate as described in claim 2, wherein the inorganic compound is present in amounts of 20 to 150 parts by weight with respect to 100 parts by weight of the binder.

7. An electroconductive substrate as described in claim 1, wherein the electroconductive pigment is present in amounts of 70 to 900 parts by weight with respect to 100 parts by weight of the binder.

8. A recording medium containing an electroconductive layer and a recording layer laid on top of said electroconductive layer on at least one side thereof wherein said electroconductive layer contains an electroconductive pigment, a normal salt and a water soluble or water dispersible binder; the binder contains 20 to 85 weight % of starch and the normal salt is maintained at 10 to 100 parts by weight with respect to 100 parts by weight of said electroconductive pigment.

9. Said recording medium as described in claim 8 further comprising said recording layer containing silicone resin particles.

10. The recording medium of claim 8 wherein the recording layer contains silicon resin particles having a particle size of 0.3 to 12 microns.

11. The recording medium of claim 10 wherein the silicon resin particles comprise 0.4 to 45 weight percent of the recording layer.

* * * * *